United States Patent
Geislinger

(10) Patent No.: US 6,176,785 B1
(45) Date of Patent: Jan. 23, 2001

(54) TORSIONAL VIBRATION DAMPER OR TORSIONALLY ELASTIC AND VIBRATION DAMPING COUPLING

(75) Inventor: Matthias Geislinger, Salzburg (AT)

(73) Assignee: Ellergon Antriebstechnik GmbH, Hallwang/Salzburg (AT)

( * ) Notice: Under 35 U.S.C. 154(b), the term of this patent shall be extended for 0 days.

(21) Appl. No.: 09/307,052

(22) Filed: May 7, 1999

(30) Foreign Application Priority Data

May 8, 1998 (AT) ............................................. 777/98

(51) Int. Cl.$^7$ ................................................. F16D 3/64
(52) U.S. Cl. ............................ 464/100; 464/101; 464/28
(58) Field of Search ................................ 74/574; 464/28, 464/100, 101; 188/290, 293; 192/208, 55.4

(56) References Cited

U.S. PATENT DOCUMENTS

| 1,328,366 | * | 1/1920 | Brown | 464/82 |
| 3,534,839 | * | 10/1970 | Campbell et al. | 192/79 |
| 4,295,348 | * | 10/1981 | Helfer et al. | 464/82 |
| 4,464,822 | * | 8/1984 | Pfeifer | 29/436 |
| 4,470,494 | * | 9/1984 | Takeuchi | 192/213.31 |

FOREIGN PATENT DOCUMENTS

| 384 085 | 9/1987 | (AT) . | |
| 0167167 | * | 11/1950 | (DE) | 464/100 |
| 1208953 | * | 1/1966 | (DE) | 464/28 |
| 2759284 | 8/1979 | (DE) . | |

* cited by examiner

Primary Examiner—Lynne H. Browne
Assistant Examiner—Aaron Dunwoody
(74) Attorney, Agent, or Firm—Collard & Roe, P.C.

(57) ABSTRACT

A torsional vibration damper or a torsionally elastic and vibration damping coupling (1) has radial spring elements (4) inserted between an inner portion (3) and an outer portion (2) for torque transmission and liquid-filled chambers (8, 9) communicating with each other via throttle gaps for damping purposes, where at the one end the spring elements (4) are clamped between adapters (5) in the outer portion (2) and at the other end engage in axial grooves (6) of the inner portion (3), and the chambers (8, 9) are separated from each other by the spring elements (4) on the one hand, and on the other hand by additional radial divisions (7) between adjacent spring elements (4), which divisions spare the throttle gaps (10). To achieve a compact design with improved possibilities for the connection of the inner portion, while reducing the risk of cavitation, the divisions (7) belong to the inner portion (3) and each consist of a foot projection (11) protruding between the axial grooves (6) and an adjoining separating web (12) extending up to the opposing adapter (5) by sparing the terminal throttle gaps (10), where in the foot projections (11) there are provided holes (14) for inserting connecting screws.

5 Claims, 2 Drawing Sheets

TORSIONAL VIBRATION DAMPER OR TORSIONALLY ELASTIC AND VIBRATION DAMPING COUPLING

FIELD OF THE INVENTION

This invention relates to a torsional vibration damper or a torsionally elastic and vibration damping coupling, comprising radial spring elements inserted between an inner portion and an outer portion for torque transmission and liquid-filled chambers communicating with each other via throttle gaps for damping purposes, where at the one end the spring elements are clamped between adapters in the outer portion and at the other end engage in axial grooves of the inner portion, and the chambers are separated from each other by the spring elements on the one hand, and on the other hand by additional radial divisions between adjacent spring elements, which spare the throttle gaps.

DESCRIPTION OF THE PRIOR ART

In these dampers or couplings the spring elements, for instance spring leaves or spring assemblies, are used for torque transmission and due to their spring-elastic properties at the same time allow to influence the occurring torsional vibrations. Due to the elasticity of the spring elements there also occurs a relative rotation between inner portion and outer portion during the torque transmission, and thus a displacement of liquid between the adjacent liquid-filled chambers, which leads to a flow through the throttle gaps and thus a hydraulic damping. For forming the chambers, there have so far been used, in addition to the spring elements extending from the outer portion into the axial grooves of the inner portion, the adapters for clamping the spring elements as an additional division between the spring elements, which adapters extend radially inwards beyond the actual clamping area with web-like projections up to the outer peripheral surface of the hub of the inner portion, sparing the throttle gaps. In the vicinity of these throttle gaps disposed radially rather far to the inside free cavities are formed during rotational movements because of the liquid rushing radially outwards due to the centrifugal force, which free cavities involve the risk of increased cavitation phenomena. In addition, the inner portion itself remains dimensioned rather small in diameter due to the construction, so that for incorporating the damper or the coupling in a drive train, the connection of the inner portion requires an externally disposed increased connecting flange, in order to achieve radial screw spacings which are sufficient for the required torque transmission, which connecting flanges correspondingly increase the entire space required for the dampers or the couplings.

It is therefore the object underlying the invention to create a damper or a coupling as described above, which with a low susceptibility to cavitation is characterized by favorable possibilities for connection when it is incorporated in a drive train, and by a compact design.

SUMMARY OF THE INVENTION

This object is solved by the invention in that the divisions belong to the inner portion and each consist of a foot projection protruding between the axial grooves and an adjoining separating web extending up to the opposing adapter by sparing the terminal throttle gap, where in the foot projections there are provided holes for inserting connecting screws. By allocating the divisions to the inner portion, the throttle gaps are moved radially to the outside, so that the damping liquid displaced into the vicinity of the outer periphery due to the rotation involves a reduction of the risk of cavitation in the throttle gaps. Due to the externally disposed throttle gaps there is in addition obtained a larger useful construction space in the vicinity of the inner portion, which provides for a widening of the inner portion extending radially to the outside, which widening is on the one hand used for designing the divisions themselves, but on the other hand offers sufficient space to provide holes for inserting connecting screws in the inner portion, namely in the vicinity of the radial height of the axial grooves or also outside the axial grooves, so that the inner portion can directly be incorporated in the drive train without additional connecting flanges. The radial distance of these holes from the damper or coupling axis can be selected so large that the torques to be transmitted do not lead to an overload of the screw fastening.

An advantageous design is obtained when the adapters have a plan form substantially corresponding to a sector of a circular ring, and the separating webs of the divisions extend up to the inner arc of the adapters. Thus, the adapters are restricted to the actual clamping area of the spring elements, and the inner arc thereof provides a clear outer delimitation of the gap.

The divisions can be made integrally with the inner portion, but it is very well possible that the divisions are composed of a bulging foot projection formed at the hub of the inner portion and a separate separating web fixed at a front plate firmly mounted on the inner portion, which despite the multipart design provides sufficient room for the arrangement of the screw holes in the vicinity of the foot projection.

For reasons of manufacturing technology, the divisions can also be prepared as separate components. The divisions may for instance consist of individual separating blocks fixed at a front plate firmly mounted on the inner portion, which separating blocks are disposed one beside the other along the outer peripheral surface of the hub of the inner portion and between their foot projections form the axial grooves, or the divisions may be composed of a separate foot projection and a separate separating web fixed at a front plate firmly mounted on the inner portion, where the foot projections provided as a sleeve form the axial grooves between each other and are clamped between front plates firmly mounted on the inner portion.

BRIEF DESCRIPTION OF THE DRAWING

In the drawing, the subject-matter of the invention is illustrated purely schematically, wherein.

DESCRIPTION OF THE PREFERRED EMBODIMENTS

Figure 1:
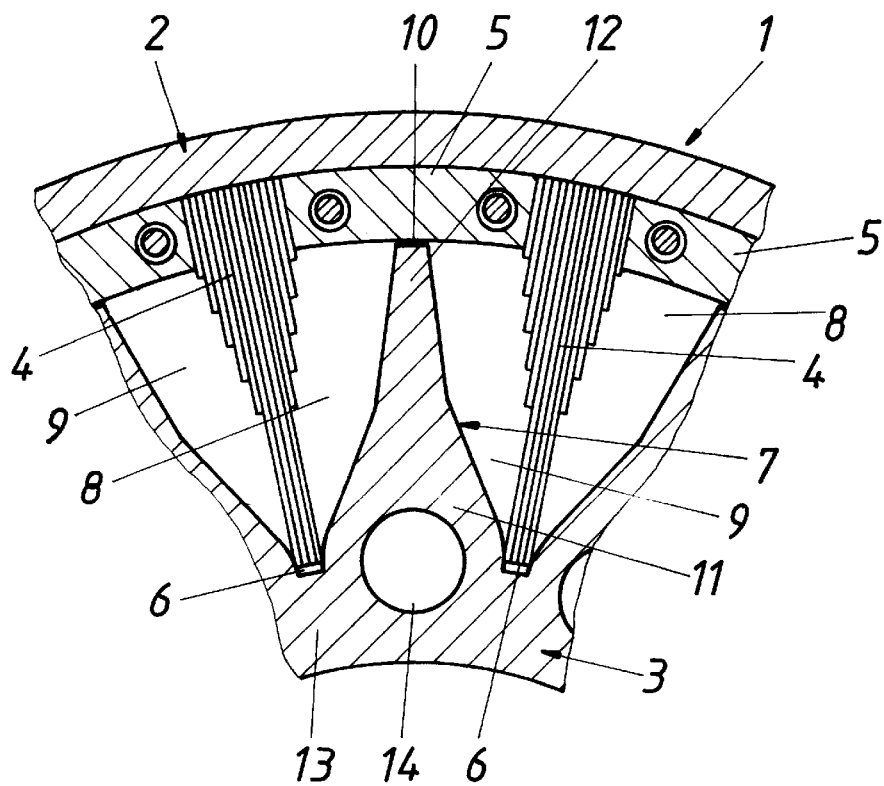
FIGS. 1, 2, 3, and 4 each represent a segment from four different embodiments of an inventive coupling in a cross-section.

A torsionally elastic and vibration damping coupling 1 has an outer portion 2, an inner portion 3 and radial spring elements 4 inserted between outer portion and inner portion for torque transmission, which spring elements 4 are at the one end clamped between adapters 5 in the outer portion 2, and at the other end engage in axial grooves 6 of the inner portion 3. For damping vibrations, the cavity between outer portion 2 and inner portion 3 is divided into individual chambers 8, 9 by the radial spring elements 4 on the one hand, and on the other hand by additional radial divisions 7 between the spring elements 4, which chambers 8, 9 are connected with each other in the vicinity of the divisions 7 via throttle gaps 10, so that by means of relative rotations of inner portion and outer portion, which are due to the rotational vibrations, the damping liquid is displaced from the one chambers into the adjacent chambers, and due to the flow through the throttle gaps 10 a hydraulic damping is obtained.

The divisions 7 belong to the inner portion 3 and each consist of a foot projection 11 protruding between the axial grooves 6, and an adjoining separating web 12 extending radially outwards up to the opposing adapters 5, where between the adapters 5 corresponding in plan form to a circular ring sector and the free end of the separating webs 12 the throttle gaps 10 are formed. The foot projections 11 protruding radially outwards from the hub 13 of the inner portion now provide sufficient space for the arrangement of holes 14 for connecting screws, so that on the side of the inner portion the coupling 1 can directly be incorporated in a drive train via these connecting screws 14, without needing a separate externally disposed connecting flange.

In accordance with the embodiment shown in FIG. 1, the divisions 7 are integrally and directly formed at the inner portion 3, but for reasons of manufacturing technology the divisions may also partly or wholly consist of separate components.

Figure 2:
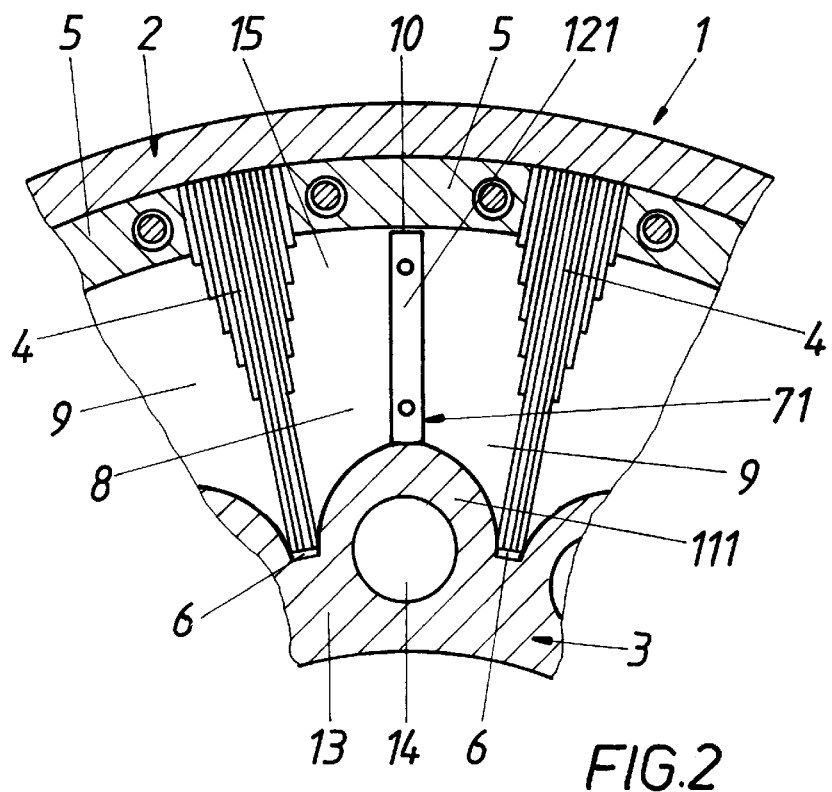
Figure 3:
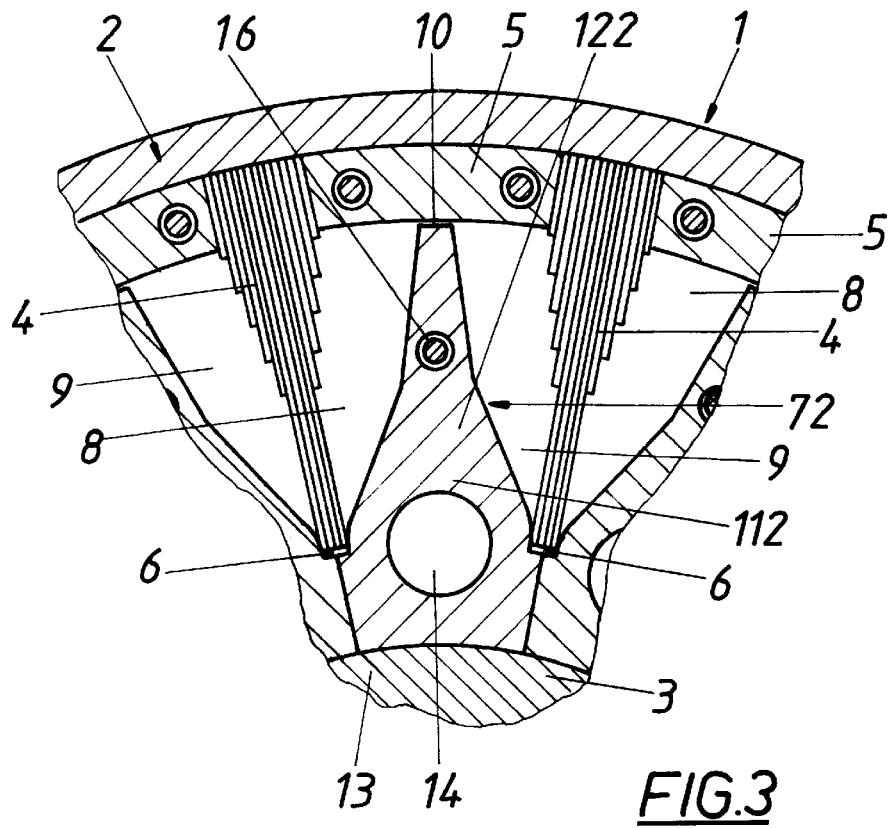

As is indicated in FIG. 2, the divisions 71 are for instance composed piece by piece, where only the bulging foot projection 111 is formed at the hub 13 of the inner portion, whereas the separating web 121 adjoins the foot projection 111 as a separate component, which separating web 121 is fixed at a front plate 15 firmly mounted on the inner portion. In accordance with the embodiment shown in FIG. 3, the divisions 72 are prefabricated as separating blocks 122, which are disposed one beside the other along the outer peripheral surface of the hub 13 of the inner portion and via screws 16 are fixed at a front plate 15 firmly mounted on the inner portion. The foot projections 112 of these separating blocks 122 in turn have holes 14 for connecting screws and between each other form the axial grooves 6 for spring engagement.

Figure 4:
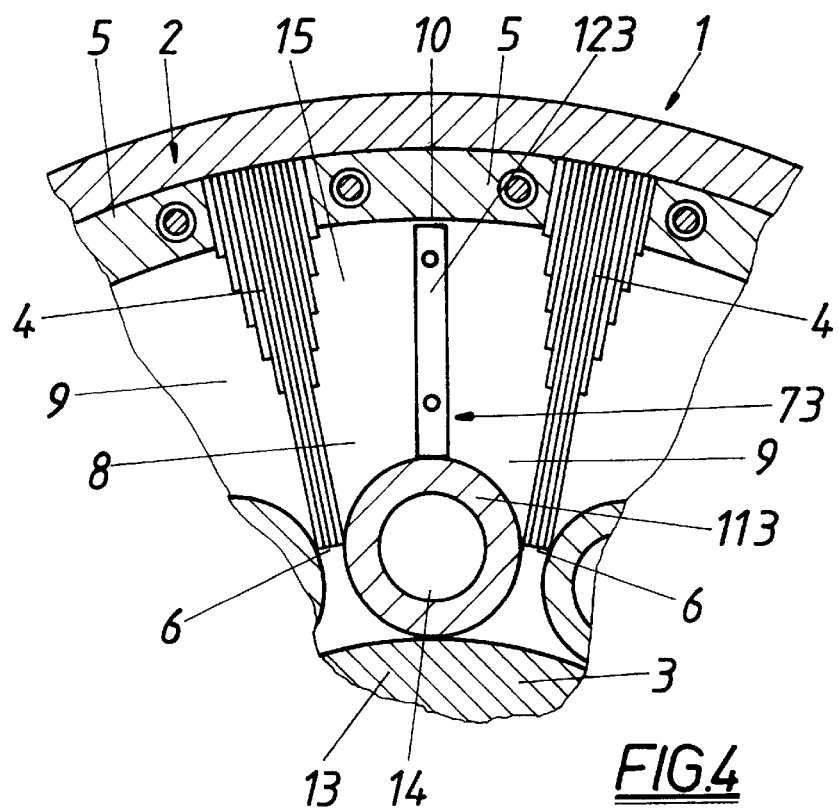

In the embodiment shown in FIG. 4, the divisions 73 are each composed of a separate foot projection provided as a sleeve 113 and a separate separating web 123, where the separating webs are fixed at a front plate 15 firmly mounted on the inner portion, and the sleeves 113 are clamped between two front plates 15 firmly mounted on the inner portion. The sleeves 113 in turn form between each other the axial grooves 6 for spring engagement and themselves serve as holes 14 for the connecting screws.

What is claimed is:

1. A torsional vibration damper or a torsionally elastic and vibration damping coupling (1), comprising radial spring elements (4) inserted between an inner portion (3) and an outer portion (2) for torque transmission, and liquid-filled chambers (8, 9) communicating with each other via throttle gaps (10) for damping purposes, where at the one end the spring elements (4) are clamped between adapters (5) in the outer portion, and at the other end engage in axial grooves (6) of the inner portion (3), and the chambers (8, 9) are separated from each other on the one hand by the spring elements (4) and on the other hand by additional radial divisions (7) between adjacent spring elements, which spare the throttle gaps (10), characterized in that the divisions (7, 71, 72, 73) belong to the inner portion (3) and each consist of a foot projection (11, 111, 112, 113) protruding between the axial grooves (6) and an adjoining separating web (12, 121, 123) extending up to the opposing adapter (5) by sparing the terminal throttle gap (10), where in the foot projections (11, 111, 112, 113) there are provided holes (14) for inserting connecting screws.

2. The damper or coupling as claimed in claim 1, characterized in that the adapters (5) have a plan form substantially corresponding to a sector of a circular ring, and the separating webs (12, 121, 123) of the divisions (7, 71, 72, 73) extend up to an inner arc of the adapters (5).

3. The damper or coupling as claimed in claim 1, characterized in that the divisions (71) are composed of a bulging foot projection (111) formed at the hub (13) of the inner portion and a separate separating web (121) fixed at a front plate (15) firmly mounted on the inner portion.

4. The damper or coupling as claimed in claim 1, characterized in that the divisions (72) consist of individual separating blocks (122) fixed at a front plate (15) firmly mounted on the inner portion, which separating blocks are disposed one beside the other along the outer peripheral surface of the hub (13) of the inner portion and between their foot projections (112) form the axial grooves (6).

5. The damper or coupling as claimed in claim 1, characterized in that the divisions (73) are composed of a separate foot projection (113) and a separate separating web (123) fixed at a front plate (15) firmly mounted on the inner portion, where the foot projections (113) provides sleeves to form the axial grooves (6) between each other and are clamped between front plates (15) firmly mounted on the inner portion.

* * * * *